US008001006B1

(12) United States Patent  (10) Patent No.: US 8,001,006 B1
Yu et al.  (45) Date of Patent: Aug. 16, 2011

(54) INTUITIVE DISPLAY OF FINANCIAL INFORMATION

(75) Inventors: Jay J. Yu, Encinatas, CA (US); Evan M. Worley, San Diego, CA (US); Anthony J. Kouma, Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 138 days.

(21) Appl. No.: 12/263,693

(22) Filed: Nov. 3, 2008

(51) Int. Cl.
 *G06Q 20/00* (2006.01)
(52) U.S. Cl. ............................. 705/19; 705/30; 705/31
(58) Field of Classification Search ........... 705/7, 14.34, 705/19, 31; 434/323
 See application file for complete search history.

(56) References Cited

U.S. PATENT DOCUMENTS

| | | | |
|---|---|---|---|
| 6,430,542 B1 * | 8/2002 | Moran | 705/36 R |
| 7,685,034 B1 * | 3/2010 | Mori et al. | 705/31 |
| 7,693,738 B2 * | 4/2010 | Guinta et al. | 705/7.32 |
| 7,716,094 B1 * | 5/2010 | Sutter et al. | 705/31 |
| 2002/0111888 A1 * | 8/2002 | Stanley et al. | 705/31 |
| 2002/0133410 A1 * | 9/2002 | Hermreck et al. | 705/19 |
| 2002/0137015 A1 * | 9/2002 | Guinta et al. | 434/323 |
| 2003/0195780 A1 * | 10/2003 | Arora et al. | 705/7 |
| 2004/0010597 A1 * | 1/2004 | Kirschner et al. | 709/228 |
| 2006/0178961 A1 * | 8/2006 | Stanley et al. | 705/31 |
| 2007/0033116 A1 * | 2/2007 | Murray | 705/31 |
| 2007/0033117 A1 * | 2/2007 | Murray | 705/31 |
| 2007/0033130 A1 * | 2/2007 | Murray | 705/36 T |
| 2007/0198390 A1 * | 8/2007 | Lazear et al. | 705/36 T |
| 2008/0059900 A1 * | 3/2008 | Murray et al. | 715/777 |
| 2008/0147494 A1 * | 6/2008 | Larson | 705/14 |
| 2008/0189197 A1 * | 8/2008 | Allanson et al. | 705/31 |
| 2009/0271256 A1 * | 10/2009 | Toebes et al. | 705/14 |

OTHER PUBLICATIONS

Fersko-Weiss, Henry. "A Versatile Approach to Your Personal Finances." Personal Computing Jun. 1, 1986: ABI/INFORM Global, ProQuest. Web. Mar. 25, 2011.*

* cited by examiner

*Primary Examiner* — Matthew S Gart
*Assistant Examiner* — Olusegun Goyea
(74) *Attorney, Agent, or Firm* — Park, Vaughan, Fleming & Dowler LLP; Steven E. Stupp (57) ABSTRACT

Embodiments of a computer system, a method, a graphical user interface and a computer-program product (e.g., software) for use with the computer system are described. These embodiments may be used to present income-tax information to a user. In particular, the user can provide aggregate values for one or more parameters in an income-tax return for the user by adjusting user-adjustable icons in the graphical user interface. In response to these user inputs, the computer system updates the displayed user-adjustable icons and determines summary information for the income-tax return which is associated with the user inputs. This summary information is displayed using a qualitative-tax-estimator icon in the graphical user interface and/or by displaying a numerical value for the summary information in a quantitative-tax-estimator window in the graphical user interface.

18 Claims, 6 Drawing Sheets

INTUITIVE DISPLAY OF FINANCIAL INFORMATION

BACKGROUND

The present invention relates to techniques for displaying financial information, and in particular, income-tax information.

Many individuals and businesses are required to prepare and submit financial information on an annual or quarterly basis. For example, individuals and businesses are required to prepare annual income-tax returns. Many of these individuals meet these obligations using financial software, such as income-tax preparation software and/or financial-planning software.

When using financial software to prepare an income-tax return, an individual is typically asked to provide financial information and supporting documents in response to a large number of questions. Unfortunately, the resulting process is time consuming, frustrating and often obscures the consequences of the user's decisions on the user's resulting income tax (such as an amount owed or an eventual refund). In particular, financial software often collects the financial information using a so-called 'bottom-up' approach, and the consequences of all of the collected financial information is only presented when answers to all of the questions have been received. Consequently, it is typically very difficult for the user to understand the financial impact of an answer to a given question. This lack of an intuitive financial understanding can prevent the user from making informed decisions that are in the user's best financial interests.

SUMMARY

One embodiment of the present invention provides a computer system that presents income-tax information. During operation, the computer system displays a graphical user interface that contains user-adjustable icons, a qualitative-tax-estimator icon and a quantitative-tax-estimator window. These user-adjustable icons are configured to receive and display inputs from a user, where a given user-adjustable icon represents an aggregate value corresponding to one or more parameters in an income-tax return for the user. Moreover, the qualitative-tax-estimator icon graphically displays summary information for the income-tax return for the user which is associated with the user inputs, and the quantitative-tax-estimator window displays a numerical value for the summary information.

Note that the income-tax return for the user may be a future income-tax return. Additionally, the numerical value may include an estimated income tax or an estimated refund.

Furthermore, the summary information may be estimated based on a financial history of the user. This financial history may include one or more previous income-tax returns of the user. In some embodiments, the summary information displayed using the qualitative-tax-estimator icon includes: summary information for the one or more previous income-tax returns of the user; and/or summary information for income-tax returns of users in the same financial category as the user.

This graphical user interface may be included in financial software, such as income-tax preparation software and/or financial-planning software.

In some embodiments, the graphical user interface displays advertising based on the user inputs to the user-adjustable icons. This advertising may be dynamically updated based on subsequent user inputs to the user-adjustable icons.

Moreover, the graphical user interface may include an outcome icon. When the user activates the outcome icon, the graphical user interface receives income-tax target information from the user when the user adjusts the qualitative-tax-estimator icon and/or provides another numerical value in the quantitative-tax-estimator window. Based on the income-tax target information, the user-adjustable icons are modified to present determined aggregate values.

Another embodiment provides a method for presenting income-tax information, which may be performed by the computer system. During operation, the computer system receives inputs from a user, which are provided by adjusting user-adjustable icons in the graphical user interface, where the given user-adjustable icon represents the aggregate value corresponding to one or more parameters in the income-tax return for the user. Then, the computer system modifies the user-adjustable icons based on the user inputs. Next, the computer system determines the summary information for the income-tax return for the user which is associated with the user inputs, and the computer system graphically displays the qualitative-tax-estimator icon corresponding to the summary information in the graphical user interface. Additionally, the computer system displays the numerical value for the summary information in the quantitative-tax-estimator window in the graphical user interface.

In some embodiments, the computer system detects user activation of the outcome icon in the graphical user interface. Then, the computer system receives income-tax target information from the user. In particular, the user provides the income-tax target information by adjusting the qualitative-tax-estimator icon and/or by providing another numerical value in the quantitative-tax-estimator window. Next, the computer system calculates the aggregate values based on the income-tax target information, and the computer system modifies the user-adjustable icons to present the calculated aggregate values.

Another embodiment provides a computer-program product for use in conjunction with the computer system.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, a graphical user interface and a computer-program product (e.g., software) for use with the computer system are described. These embodiments may be used to present income-tax information to a user. In particular, the user can provide aggregate values for one or more parameters in an income-tax return for the user by adjusting user-adjustable icons in the graphical user interface. In response to these user inputs, the computer system updates the displayed user-adjustable icons and determines summary information for the income-tax return which is associated with the user inputs. This summary information is displayed using a qualitative-tax-estimator icon in the graphical user interface and/or by displaying a numerical value for the summary information in a quantitative-tax-estimator window in the graphical user interface.

By receiving user inputs and displaying their consequences for the user's income-tax return in graphical and/or numerical format, this presentation technique provides immediate, visual feedback to users of financial software on the consequences of their inputs. Consequently, the presentation technique allows users to understand the financial impact of the financial information they are providing, and therefore, allows users to make informed decisions that are in their best financial interests. During this process, the presentation technique reduces the time needed to complete an income-tax return using the financial software (by increasing user efficiency) and increases user satisfaction with the financial software.

While income-tax information and income-tax returns are used as illustrative examples in the discussion that follows, in other embodiments the presentation technique is used with a variety of financial information in multiple applications (such as financial-planning or financial-accounting software).

We now describe embodiments of a graphical user interface to present income-tax information. As noted previously, many individuals and businesses do not understand how their financial decisions impact their resulting income taxes. Moreover, these individuals also do not understand the relative importance of the financial information they provide when using financial software to prepare income-tax returns. Consequently, many individuals waste considerable effort providing information that does not impact their income taxes, and they often miss opportunities to reduce their income taxes or to increase the size of their refunds.

These problems can be addressed using a graphical user interface to present qualitative and quantitative income-tax implications of the financial information provided by a user (which collectively is sometimes referred to as 'user inputs'). This graphical user interface combines ease of use with immediate, visual feedback on the consequences of the user inputs for the user's income-tax return, which allows the user to intuitively understand the relationship between the user's financial information and the user's income-tax return. This capability allows the user: to forecast a future income-tax return, to explore 'what if' scenarios (such as the consequences of various 'life' events), and/or to compare the user's income-tax return with those of individuals with similar financial profiles, who are in a common financial category. Note that the comparative information in the graphical user interface may promote social interaction between these individuals, which may be leveraged to create social awareness, such as support for charities.

Figure 1A:
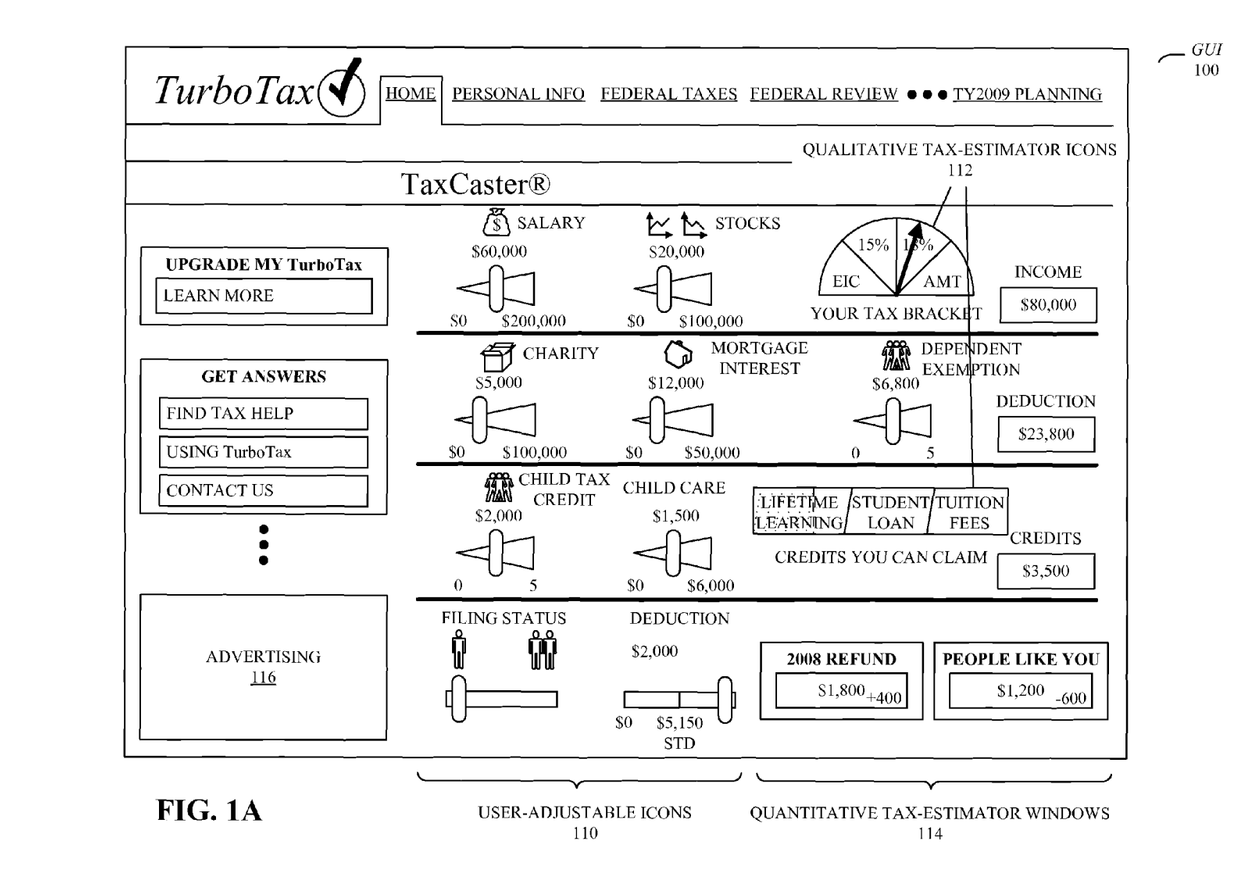
FIG. 1A is a drawing illustrating a graphical user interface that presents income-tax information in accordance with an embodiment of the present invention.

FIG. 1A presents a drawing illustrating a graphical user interface (GUI) 100 that presents income-tax information. This graphical user interface displays both the qualitative and the quantitative consequences of the user information provided by the user using a financial dashboard (which is sometimes referred to as a 'TaxCaster®'). Graphical user interface 100 may make it easier for the user to understand the relationship between the user's financial information and an income-tax return for the user (such as a future income-tax return). In addition, graphical user interface 100 may provide ongoing analysis of the user's income, deductions and credits, so the user can plan for the future.

Graphical user interface 100 contains user-adjustable icons 110, one or more qualitative-tax-estimator icons 112 and one or more quantitative-tax-estimator windows 114. User-adjustable icons 110 are configured to receive and display inputs from the user. For example, the user-adjustable icons 110 may each include a slider icon that allows the user to dynamically change and play with the associated user input. Note that a given user-adjustable icon represents an aggregate value corresponding to one or more parameters in an income-tax return for the user, including: income, stocks, charitable contributions, mortgage interest, a child tax credit, a child-care credit, a filing status (married versus single) and deductions.

In response to one or more user inputs, a computer system (such as computer system 300 in FIG. 3 and computer system 400 in FIG. 4) may accordingly modify the user-adjustable icons 110. In addition, the computer system may determine summary information associated with the user inputs for the income-tax return for the user. In some embodiments, the summary information is estimated based on a financial history of the user, which may include one or more previous income-tax returns of the user. Moreover, this summary information may be graphically displayed using qualitative-tax-estimator icons 112, and one or more numerical values for the summary information may be displayed in quantitative-tax-estimator windows 114.

For example, as the user answers questions associated with user-adjustable icons 110, qualitative-tax-estimator icons 112 may visually present the user's tax bracket on a dial, and deductions and/or credits in a shaded bar. Furthermore, quantitative-tax-estimator windows 114 may present an estimate of the total amount owed or the user's refund. In addition, comparative information may be provided, such as: the change in the amount owed or the refund relative to the user's income-tax return for the previous year (as indicated by the +400 in one of the quantitative-tax-estimator icons 114, which shows the user's 2008 refund); and/or how the amount owed or refunded to the user compares with individuals that have similar financial profiles to the user (as indicated by the −600 in the other one of the quantitative-tax-estimator icons 114, which shows the tax refund of people like the user). Consequently, graphical user interface 100 provides a clear visual representation of the user's complete income-tax situation at a given time.

In some embodiments, the financial information and income-tax information (e.g., the user's financial profile) in graphical user interface 100 is used to identify and present targeted advertisements, such as advertising 116, to the user. For example, a real-estate agent may pay to place an advertisement in graphical user interface 100 based on the user's mortgage-interest deduction or the absence of a mortgage-interest deduction. Advertising 116 may be dynamically updated based on subsequent user inputs to the user-adjustable icons 110.

Figure 1B:
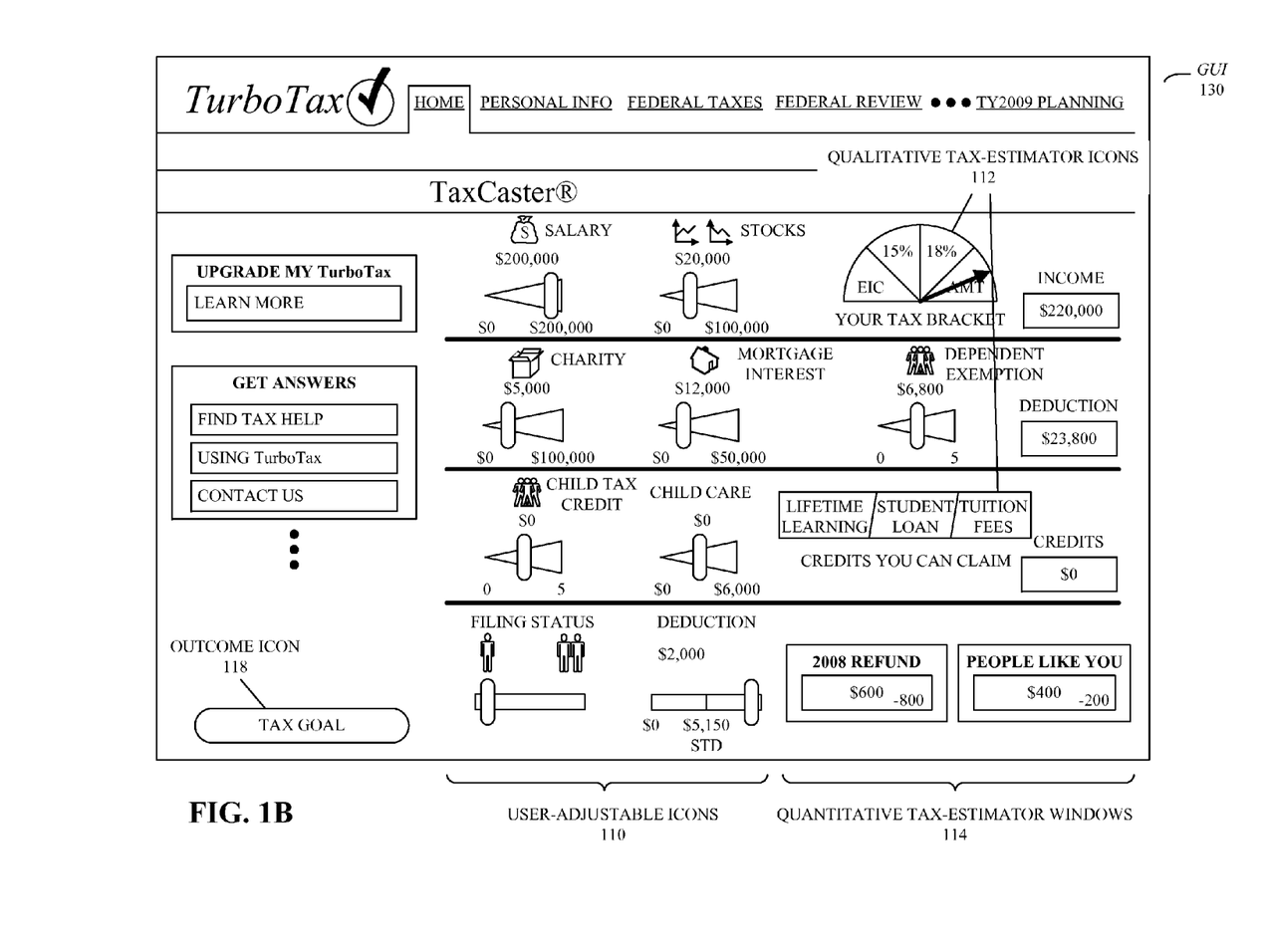
FIG. 1B is a drawing illustrating a graphical user interface that presents income-tax information in accordance with an embodiment of the present invention.

FIG. 1B presents a drawing illustrating a graphical user interface (GUI) 130 that presents income-tax information. This graphical user interface illustrates the income-tax consequences of different financial information provided by the user.

Graphical user interface 130 also includes an outcome icon 118. When the user activates outcome icon 118, graphical user interface 130 receives income-tax target information from the user when the user adjusts any of the qualitative-tax-estimator icons 112 or provides numerical values in one or more of the quantitative-tax-estimator windows 114. This income-tax target information is used by the computer system to determine corresponding aggregate values, which are presented by modifying the user-adjustable icons 110. In this way, the user can work back from income-tax goals or targets to see the financial inputs that are needed to achieve them.

In some embodiments, graphical user interfaces 100 (FIG. 1A) and 130 include additional components or fewer components. Moreover, two or more components may be combined into a single component, and/or a position of one or more components may be changed.

Figure 2:
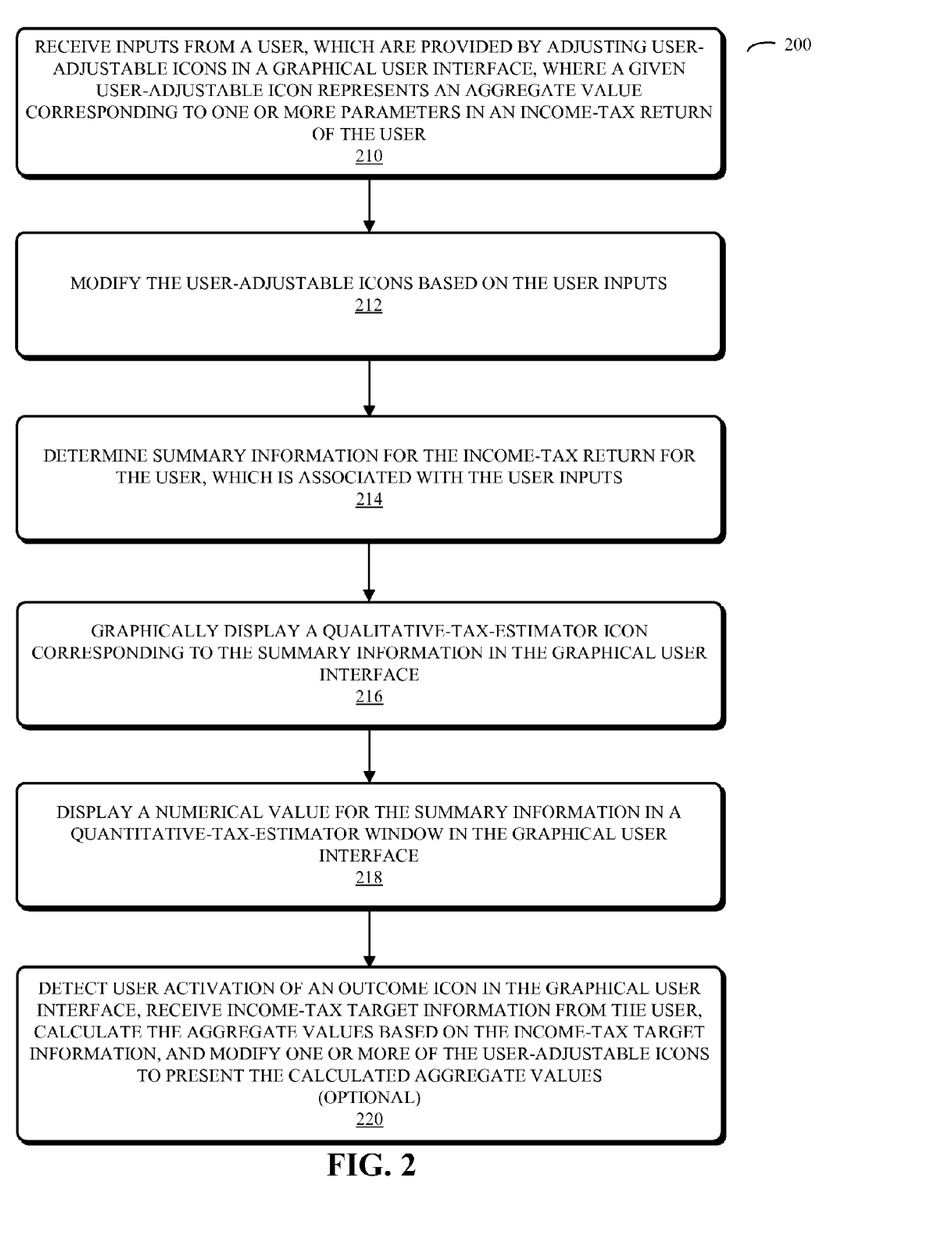
FIG. 2 is a flow chart illustrating a process for presenting income-tax information in accordance with an embodiment of the present invention.

We now describe embodiments of a process for providing income-tax information. FIG. 2 presents a flow chart illustrating a process 200 for presenting income-tax information, which may be performed by the computer system. During operation, the computer system receives inputs from a user (210), which are provided by adjusting user-adjustable icons in a graphical user interface (such as graphical user interface 100 in FIG. 1A), where the given user-adjustable icon represents the aggregate value corresponding to one or more parameters in the income-tax return for the user. Then, the computer system modifies the user-adjustable icons based on the user inputs (212). Next, the computer system determines the summary information for the income-tax return for the user which is associated with the user inputs (214), and the computer system graphically displays the qualitative-tax-estimator icon corresponding to the summary information in the graphical user interface (216). Additionally, the computer system displays the numerical value for the summary information in the quantitative-tax-estimator window in the graphical user interface (218).

In some embodiments, the computer system optionally detects user activation of the outcome icon in the graphical user interface (220). Then, the computer system optionally receives income-tax target information from the user (220). In particular, the user provides the income-tax target information by adjusting the qualitative-tax-estimator icon and/or by providing another numerical value in the quantitative-tax-estimator window. Next, the computer system optionally calculates the aggregate values based on the income-tax target information (220), and the computer system optionally modifies one or more of the user-adjustable icons to present the calculated aggregate values (220).

Note that in some embodiments of process 200, there are additional or fewer operations. Moreover, the order of the operations may be changed, and/or two or more operations may be combined into a single operation.

Figure 3:
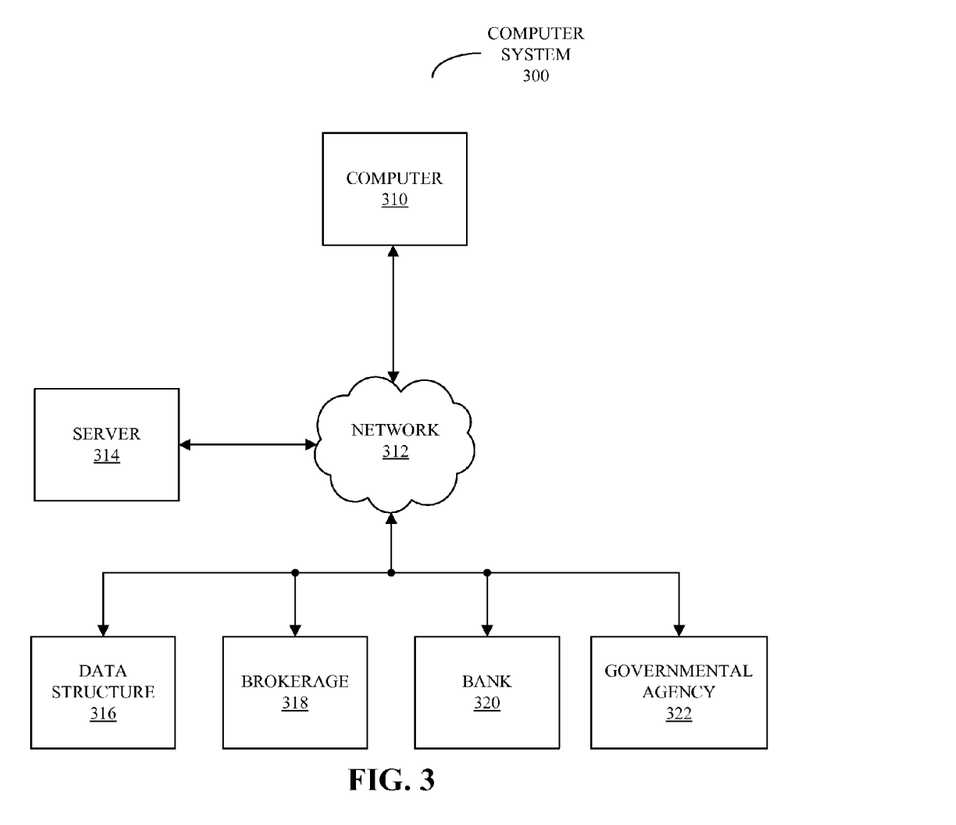
FIG. 3 is a block diagram illustrating a networked computer system that presents income-tax information in accordance with an embodiment of the present invention.

We now describe embodiments of a computer system that performs process 200. FIG. 3 presents a block diagram illustrating a networked computer system 300 that presents income-tax information. In this computer system, a user enters or provides one or more aggregate values (and, more generally, financial information of the user), each of which corresponds to one or more parameters in an income-tax return for the user, using financial software that is resident and executes on computer 310. In particular, the user may adjust one or more user-adjustable icons in a graphical user interface that is displayed on computer 310. Alternatively, the user may adjust the one or more user-adjustable icons in the graphical user interface utilizing a financial tool that is embedded in a web page. Instructions for this web page may be provided by server 314 via network 312, and these instructions may be rendered by a web browser on computer system 310.

Note that the financial tool may be a stand-alone application or a portion of another application (such as financial software that is resident on and/or that executes on server 314). In an illustrative embodiment, the financial tool is a software package written in: JavaScript™ (a trademark of Sun Microsystems, Inc.), e.g., the task-management tool includes programs or procedures containing JavaScript instructions, ECMAScript (the specification for which is published by the European Computer Manufacturers Association International), VBScript™ (a trademark of Microsoft, Inc.) or any other client-side scripting language. In other words, the embedded financial tool may include programs or procedures containing: JavaScript, ECMAScript instructions, VBScript instructions, or instructions in another programming language suitable for rendering by a web browser or another client application on computer 310.

Then, financial software on computer 310 and/or server 314 may modify icons and windows in the displayed graphical user interface on computer 310. For example, server 314 may provide instructions for a revised graphical user interface, which are rendered by the web browser or other client application on computer 310. As discussed previously, the user may dynamically modify the aggregate values to determine the consequences for the user's income-tax return. Alternatively or additionally, the user may specify income-tax target information, and the graphical user interface on computer 310 may display the corresponding aggregate values that are needed to obtain these goals or targets.

While interacting with the user and preparing the user's income-tax return, the financial software on computer 310 and/or server 314 may access financial information associated with the user at remote locations in computer system 300. For example, the financial software may access a financial history of the user (such as one or more previous income-tax returns of the user) which is stored in data structure 316 on a server. Alternatively or additionally, the financial software may access user accounts that are stored on servers of a brokerage 318, a bank 320, and/or a governmental agency 322.

Moreover, the service provider of the financial software may be paid by a third party, such as brokerage 318, to present targeted advertising in the graphical user interface on computer 310. This targeted advertising may be based on the financial information and/or aggregate values provided by the user, as well as the consequences of this information for the user's income-tax return. More generally, the targeted advertising may be based on the user's financial profile. For example, the user may be associated with a group of individuals (such as individuals in a financial category) that have similar income, deductions, and credits to the user, and advertising may be identified and presented to the user based on the interests of this group.

In general, information, such as the financial information and the user's income-tax return, may be stored at one or more other locations in computer system 300 (i.e., locally or remotely). Moreover, because this information may be sensitive information, it may be encrypted. For example, stored information and/or information communicated via network 312 may be encrypted.

Computers and servers in computer system 300 may include one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture). Moreover, network 312 may include: the Internet, World Wide Web (WWW), an intranet, LAN, WAN, MAN, or a combination of networks, or other technology enabling communication between computing systems.

In exemplary embodiments, the financial software includes software such as: Quicken™ and/or TurboTax™ (from Intuit, Inc., of Mountain View, Calif.), Microsoft Money™ (from Microsoft Corporation, of Redmond, Wash.), Splash-Money™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial software may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), and/or other payroll or accounting software capable of processing payroll information.

In some embodiments, the financial tool is associated with third-party software or web pages. For example, the financial tool may be embedded in a real-estate agent's web page (which is rendered by the web browser on computer 310) to visually illustrate the income-tax consequences of buying a house. Alternatively, a bank's web page (which is rendered by the web browser on computer 310) may use the financial tool to visually illustrate the consequences of paying off a student loan early. Similarly, professional income-tax preparers/accountants may utilize the financial tool when providing financial service to clients.

Figure 4:
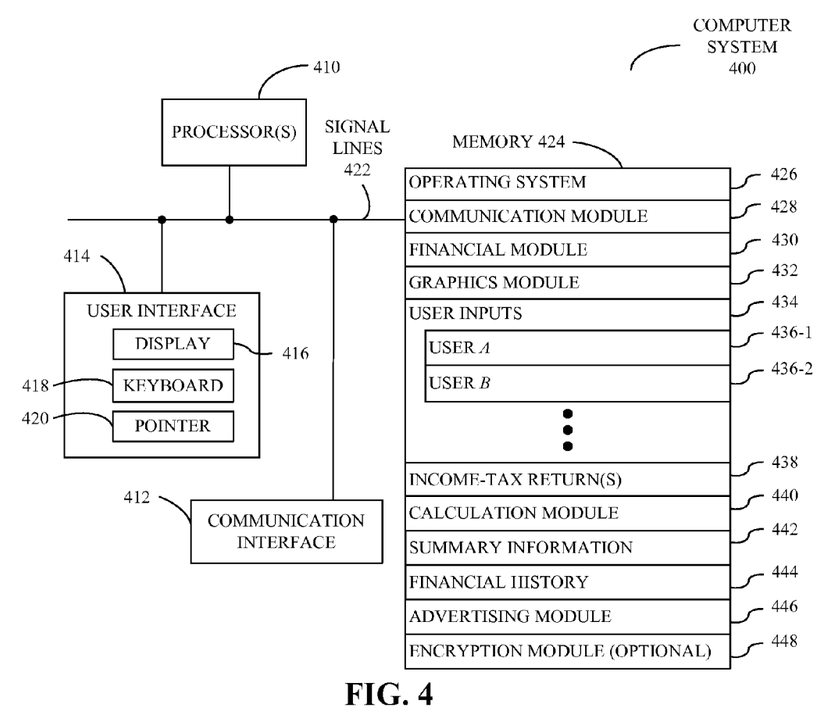
FIG. 4 is a block diagram illustrating a computer system that presents income-tax information in accordance with an embodiment of the present invention.

FIG. 4 presents a block diagram illustrating a computer system 400 that presents income-tax information. Computer system 400 includes one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. While not explicitly indicated in the computer system 400, in some embodiments the operating system 426 includes a web browser. Memory 424 may also store procedures (or a set of instructions) in a communication module 428. These communication procedures may be used for communicating with one or more computers and/or servers, including computers and/or servers that are remotely located with respect to the computer system 400.

Memory 424 may also include multiple program modules (or a set of instructions), including: financial module 430 (or a set of instructions), graphics module 432 (or a set of instructions), calculation module 440 (or a set of instructions), advertising module 446 (or a set of instructions) and/or optional encryption module 448 (or a set of instructions). Users may provide user inputs 434, such as user inputs from user A 436-1 and user B 436-2, to financial module 430 using one or more user-adjustable icons in a graphical user interface that is displayed on display 416. For example, the user inputs from a user may include financial information for the user's income-tax return. In response to this user's inputs, graphics module 432 may modify the displayed user-adjustable icons in the graphical user interface.

Then, calculation module 440 may determine summary information 442 associated with the user inputs from the user. This summary information may be associated with a future income-tax return for the user, and may be based on a financial history 444 of the user (which may include one or more previous income-tax returns of the user). Moreover, graphics module 432 may present the summary information and associated numerical values to the user by modifying one or more qualitative-tax-estimators and one or more quantitative-tax-estimator windows in the graphical user interface.

In some embodiments, the summary information presented to the user includes comparisons with income-tax returns 438 of one or more other individuals. Moreover, in some embodiments, advertising module 446 presents targeted advertising to the user in the graphical user interface based on the user inputs, the summary information, and/or the user's previous or future income-tax return(s).

Note that, if the user activates an outcome icon in the graphical user interface, calculation module 440 may reverse the calculations. In particular, instead of calculating summary information based on the user inputs, calculation module 440 may calculate the user inputs or aggregate values based on qualitative and/or quantitative income-tax target information provided by the user. Graphics module 432 may present these calculated aggregate values to the user by modifying one or more of the user-adjustable icons in the graphical user interface.

In some embodiments, at least some of the information stored in memory 424 and/or at least some of the information communicated using communication module 428 is encrypted using optional encryption module 448.

Instructions in the various modules in the memory 424 may be implemented in: a high-level procedural language, an object-oriented programming language, and/or in an assembly or machine language. Note that the programming language may be compiled or interpreted, e.g., configurable or configured, to be executed by the one or more processing units 410.

Although the computer system 400 is illustrated as having a number of discrete items, FIG. 4 is intended to be a functional description of the various features that may be present in the computer system 400 rather than a structural schematic of the embodiments described herein. In practice, and as recognized by those of ordinary skill in the art, the functions of the computer system 400 may be distributed over a large number of servers or computers, with various groups of the servers or computers performing particular subsets of the functions. In some embodiments, some or all of the functionality of the computer system 400 may be implemented in one or more application-specific integrated circuits (ASICs) and/or one or more digital signal processors (DSPs).

Computer systems 300 (FIG. 3) and/or 400 may include fewer components or additional components. Moreover, two or more components may be combined into a single component, and/or a position of one or more components may be changed. In some embodiments, the functionality of the computer system 400 may be implemented more in hardware and less in software, or less in hardware and more in software, as is known in the art.

Figure 5:
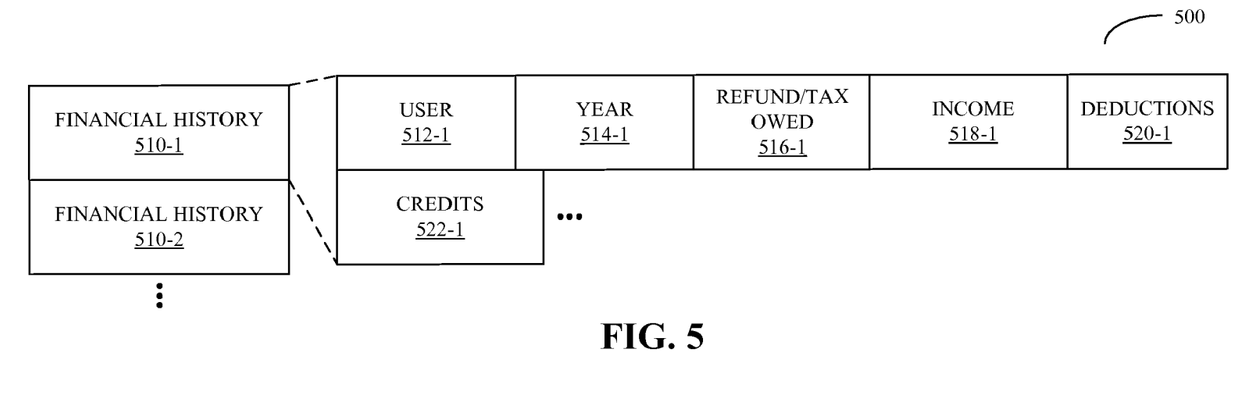
FIG. 5 is a block diagram illustrating a data structure in accordance with an embodiment of the present invention.

We now discuss data structures that may be used in computer system 300 (FIG. 3) and/or 400. FIG. 5 presents a block diagram illustrating a data structure 500. This data structure may include financial histories 510 for one or more users. For example, financial history 510-1 may include: a user 512-1, a year 514-1, and income-tax return information, such as: refund/tax owed 516-1, income 518-1, deductions 520-1, and/or credits 522-1. Note that in some embodiments of the data structure 500 there are fewer or additional components. Moreover, two or more components may be combined into a single component, and/or a position of one or more components may be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory computer-readable storage-medium comprising instructions that, when executed by a computer system, cause the computer system to display a graphical user interface to a user, the graphical user interface comprising:
   user-adjustable icons configured to receive and display inputs from the user, wherein a given user-adjustable icon represents an aggregate value corresponding to one or more parameters in an income-tax return for the user;
   a qualitative-tax-estimator icon that graphically displays summary information for the income-tax return for the user associated with the user inputs;
   a quantitative-tax-estimator window that displays a numerical value for the summary information; and
   an outcome icon, wherein, when the user activates the outcome icon, the graphical user interface:
      reconfigures the qualitative-tax-estimator icon and the quantitative-tax-estimator window to receive income-tax target information,
      receives income-tax target information from the user when the user adjusts the qualitative-tax-estimator icon or provides another numerical value in the quantitative-tax-estimator window,
      determines aggregate values for the user-adjustable icons based on the income-tax target information, and
      reconfigures the user-adjustable icons to display the aggregate values.

2. The graphical user interface of claim 1, wherein the income-tax return for the user is a future income-tax return.

3. The graphical user interface of claim 1, wherein the numerical value includes an estimated income tax or an estimated refund.

4. The graphical user interface of claim 1, wherein the summary information is estimated based on a financial history of the user.

5. The graphical user interface of claim 4, wherein the financial history includes one or more previous income-tax returns of the user.

6. The graphical user interface of claim 1, wherein the summary information displayed using the qualitative-tax-estimator icon includes summary information for one or more previous income-tax returns of the user.

7. The graphical user interface of claim 1, wherein the summary information displayed using the qualitative-tax-estimator icon includes summary information for income-tax returns of users in the same financial category as the user.

8. The graphical user interface of claim 1, wherein the graphical user interface is included in financial software.

9. The graphical user interface of claim 8, wherein the financial software includes income-tax preparation software or financial-planning software.

10. The graphical user interface of claim 1, wherein the graphical user interface displays advertising based on the user inputs to the user-adjustable icons.

11. The graphical user interface of claim 10, wherein the advertising is dynamically updated based on subsequent user inputs to the user-adjustable icons.

12. A computer-implemented method for presenting income-tax information, comprising:
   receiving, by computer, inputs from a user, which are provided by adjusting user-adjustable icons in a graphical user interface, wherein a given user-adjustable icon represents an aggregate value corresponding to one or more parameters in an income-tax return for the user;
   modifying, by computer, the user-adjustable icons based on the user inputs;
   determining, by computer, summary information for the income-tax return for the user, which is associated with the user inputs;
   graphically displaying, by computer, a qualitative-tax-estimator icon corresponding to the summary information in the graphical user interface; and
   displaying, by computer, a numerical value for the summary information in a quantitative-tax-estimator window in the graphical user interface;
   in response to receiving, by computer, a selection of an outcome icon:
      reconfiguring the qualitative-tax-estimator icon and the quantitative-tax-estimator window to receive income-tax target information,
      receiving income-tax target information from the user when the user adjusts the qualitative-tax-estimator icon or provides another numerical value in the quantitative-tax-estimator window,
      determining aggregate values for the user-adjustable icons based on the income-tax target information, and
      reconfiguring the user-adjustable icons to display the aggregate values.

13. The method of claim 12, wherein the numerical value includes an estimated income tax or an estimated refund.

14. The method of claim 12, wherein the summary information is estimated based on a financial history of the user.

15. A computer-program product for use in conjunction with a computer system, the computer-program product comprising a computer-readable storage medium and a computer-program mechanism embedded therein for configuring the computer system, the computer-program mechanism including:

instructions for receiving inputs from a user, which are provided by adjusting user-adjustable icons in a graphical user interface, wherein a given user-adjustable icon represents an aggregate value corresponding to one or more parameters in an income-tax return for the user;

instructions for modifying the user-adjustable icons based on the user inputs;

instructions for determining summary information for the income-tax return for the user, which is associated with the user inputs;

instructions for graphically displaying a qualitative-tax-estimator icon corresponding to the summary information in the graphical user interface;

instructions for displaying a numerical value for the summary information in a quantitative-tax-estimator window in the graphical user interface; and     instructions for, in response to receiving a selection of an outcome icon:

reconfiguring the qualitative-tax-estimator icon and the quantitative-tax-estimator window to receive income-tax target information,         receiving income-tax target information from the user when the user adjusts the qualitative-tax-estimator icon or provides another numerical value in the quantitative-tax-estimator window,         determining aggregate values for the user-adjustable icons based on the income-tax target information, and         reconfiguring the user-adjustable icons to display the aggregate values.

16. The computer-program product of claim 15, wherein the numerical value includes an estimated income tax or an estimated refund.

17. The computer-program product of claim 15, wherein the summary information is estimated based on a financial history of the user.

18. A computer system, comprising:

a processor;

memory; and a program module, wherein the program module is stored in the memory and configurable to be executed by the processor, the program module including:

instructions for receiving inputs from a user, which are provided by adjusting user-adjustable icons in a graphical user interface, wherein a given user-adjustable icon represents an aggregate value corresponding to one or more parameters in an income-tax return for the user;

instructions for modifying the user-adjustable icons based on the user inputs;

instructions for determining summary information for the income-tax return for the user associated with the user inputs;

instructions for graphically displaying a qualitative-tax-estimator icon corresponding to the summary information in the graphical user interface;

instructions for displaying a numerical value for the summary information in a quantitative-tax-estimator window in the graphical user interface; and     instructions for, in response to receiving a selection of an outcome icon:

reconfiguring the qualitative-tax-estimator icon and the quantitative-tax-estimator window to receive income-tax target information,         receiving income-tax target information from the user when the user adjusts the qualitative-tax-estimator icon or provides another numerical value in the quantitative-tax-estimator window,         determining aggregate values for the user-adjustable icons based on the income-tax target information, and         reconfiguring the user-adjustable icons to display the aggregate values.

\* \* \* \* \*